United States Patent [19]

Thayer

[11] Patent Number: 4,848,664
[45] Date of Patent: Jul. 18, 1989

[54] YAW THRUST VECTORING EXHAUST NOZZLE

[75] Inventor: Edward B. Thayer, Jupiter, Fla.

[73] Assignee: United Technologies Corporation, Hartford, Conn.

[21] Appl. No.: 129,819

[22] Filed: Dec. 7, 1987

[51] Int. Cl.⁴ .............................................. F02K 1/12
[52] U.S. Cl. ........................... 239/265.29; 239/265.35; 239/265.41; 244/23 D; 244/52
[58] Field of Search ...................... 239/265.19, 265.21, 239/265.27, 265.29, 265.33, 265.35, 265.37, 265.39, 265.41; 244/12.5, 23 D, 52, 110 B; 60/226.2, 230, 232

[56] References Cited

U.S. PATENT DOCUMENTS

| 2,995,010 | 8/1961 | Arscott | 239/265.39 |
| 4,361,281 | 11/1982 | Nash | 239/265.37 |
| 4,502,638 | 3/1985 | Szuminski et al. | 239/265.29 |
| 4,605,169 | 8/1986 | Mayers | 239/265.29 |
| 4,641,782 | 2/1987 | Woodward | 239/265.29 |
| 4,690,329 | 9/1987 | Madden | 239/265.19 |
| 4,753,392 | 6/1988 | Thayer | 239/265.29 |

FOREIGN PATENT DOCUMENTS 132761 2/1985 European Pat. Off. ....... 239/265.37

Primary Examiner—Andres Kashnikow
Assistant Examiner—Michael J. Forman
Attorney, Agent, or Firm—Troxell K. Snyder

[57] ABSTRACT

A yaw and pitch thrust vectoring exhaust nozzle (10) includes upper and lower divergent flap assemblies (22, 24) each divided by oppositely skewed diagonal hinges (58, 60). Vertical sidewalls (27, 28) are also hinged to open the nozzle outlet laterally during yaw thrust.

4 Claims, 3 Drawing Sheets

YAW THRUST VECTORING EXHAUST NOZZLE

FIELD OF THE INVENTION

The present invention relates to an exhaust nozzle for a gas turbine engine, and more particularly, to an exhaust nozzle having yaw thrust vectoring capability.

BACKGROUND

Thrust vectoring exhaust nozzles which achieve a varying thrust vector in a single plane are well known in the art. One such nozzle, a two dimensional convergent-divergent arrangement wherein a substantially rectangular flow passage is defined laterally by two parallel, spaced apart sidewalls, and vertically by two movable flap assemblies. Each flap assembly further includes a convergent flap, pivotable into the exhaust gas stream for varying the area of the nozzle throat, and a divergent flap hinged at its leading edge to the trailing edge of the corresponding convergent flap and independently movable for defining both the vertical discharge vector and expansion rate of the exhaust gas stream.

Such two dimensional nozzles provide effective, single plane thrust vectoring, typically in the vertical or pitch direction, without overly complicated linkage or other components. As with any aircraft application, weight is a critical factor, thus simple and effective designs are favored over more complicated and hence heavier arrangements.

The advantages of a multiplane, i.e., both yaw and pitch, thrust vectoring nozzle are also well known and highly desirable. Prior art designs of such multiplane thrust vectoring nozzles, however, have not matched the simplicity and light weight of the single plane, 2-D convergent-divergent nozzle discussed above. The highly desirable capability of the prior art multiplane thrust vectoring nozzles must therefore be traded off against the increased weight and complexity such designs entail. It may therefore be the choice of the airframe designer to settle for the advantage of a single plane thrust vectoring arrangement and to forego the undesirable weight penalty thus far inherent in the multiplane thrust vectoring nozzles.

There is thus a need for a multiplane thrust vectoring exhaust nozzle which is able to achieve such function without adding overly complex and weighty components.

SUMMARY OF THE INVENTION

It is therefore an object of the present invention to provide a yaw and pitch thrust vectoring exhaust nozzle.

According to the present invention, an exhaust nozzle for a gas turbine engine or the like is provided with a pair of outwardly hinged sidewalls and movable upper and lower flap assemblies. The flap assemblies are each hinged at their respective leading edges and are pivotable in the vertical plane for redirecting the engine exhaust, thereby achieving pitch thrust vectoring with respect to the nozzle central axis.

Each flap assembly is further divided by a skewed hinge into a pair of triangular flaps. The hinges are skewed oppositely in the upper and lower flap assemblies allowing each assembly to be selectively reconfigured to define an asymmetric nozzle gas flow passage for achieving yaw thrust vectoring with respect to the nozzle central axis.

Specifically, an upper flap assembly divided by a positively skewed hinge is selectably reconfigured by rotating the downstream flap member about the corresponding skewed hinge away from the nozzle central axis. With the lower flap assembly maintained in a substantially planar configuration, the gas flow passage defined by the sidewalls and flap assemblies directs the exhaust gases from the nozzle at a lateral angle with respect to the central axis, thereby achieving yaw thrust vectoring in the right hand direction. It is further a feature of the nozzle according to the present invention that the corresponding right sidewall is rotated outward from the nozzle axis, thereby enhancing the vectoring performance of the nozzle according to the present invention by allowing the gas to flow in the direction induced by the reconfigured nozzle flow passage.

Left hand thrust vectoring is likewise achieved by reconfiguring the lower flap assembly, retaining the upper flap assembly in a generally planar configuration similar to the above description.

One particular advantage of the skewed hinge assemblies of the nozzle according to the present invention is the ability to achieve such yaw thrust vectoring with a minimum of additional hardware as compared to prior art, pitch thrust only, two dimensional exhaust nozzles. Aside from the oppositely skewed hinges and the hinged sidewalls, the nozzle according to the present invention achieves effective yaw thrust vectoring through the addition of relatively few hardware components. The nozzle according to the present invention is thus able to provide multiplane thrust vectoring with a minimum of additional hardware, and hence weight, as compared to prior art, pitch thrust vectoring only, nozzles. Both these and other objects and advantages of the nozzle according to the present invention will become apparent to those skilled in the art upon careful inspection of the following description and the appended claims and drawing figures.

DETAILED DESCRIPTION OF THE PREFERRED EMBODIMENT

Figure 1:
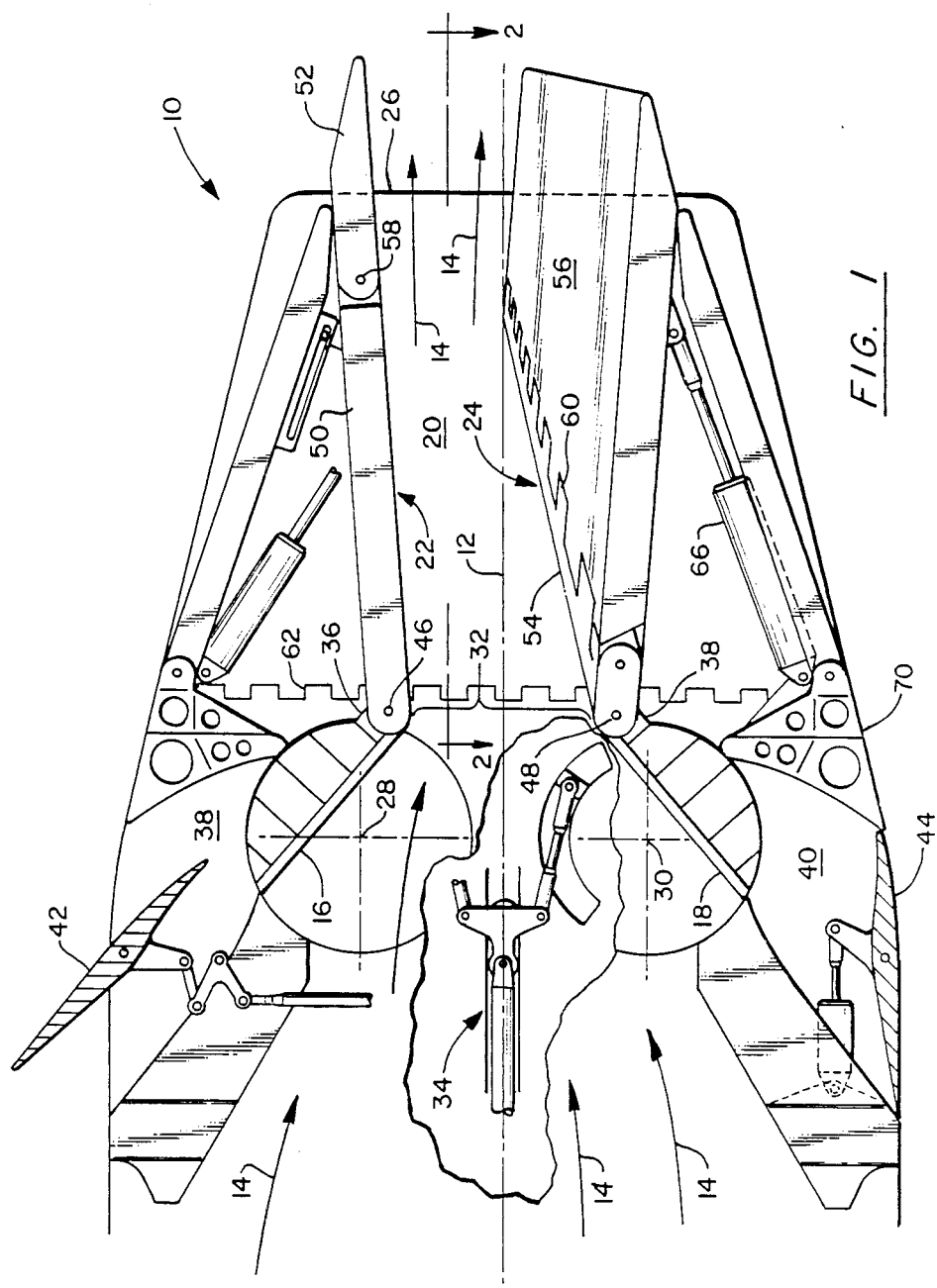
FIG. 1 shows a cross section of an exhaust nozzle according to the present invention configured to induce yaw thrust.

FIG. 1 shows a cross section of the nozzle according to the present invention taken in a vertical plane through the nozzle centerline 12. The nozzle receives a stream of exhaust gas 14 flowing generally axially rearward past opposed upper and lower convergent flaps 16, 18 and into an outlet passage 20 defined between upper and lower flap assemblies 22, 24 and the opposed, generally vertical sidewalls 26 (and 27, not shown in FIG. 1). Convergent flaps 16, 18 pivot in unison about respective, lateral axes 28, 30 for defining a convergent nozzle throat 32 at the upstream entrance of the nozzle outlet passage 20. A linkage mechanism 34 is provided to pivot the convergent flaps 16, 18 symmetrically with respect to the nozzle axis 12, thereby defining a variable area rectangular convergent throat 32. The area of the nozzle throat 32 is selected by the aircraft operator or engine control system responsive to the flow and pressure requirements of the upstream gas turbine engine (not shown). According to the embodiment of the nozzle shown in FIG. 1, convergent flaps 16, 18 may be pivoted about their respective axes 28, 30 such that the trailing edges 36, 38 contact each other for wholly closing off the axially rearward flow of exhaust gas 14. Such closing of the entrance of the outlet channel 20 is accompanied by opening alternate exhaust gas flow passages 38, 40 and the respective reverser flap doors 42, 44. The opened doors, such as door 42 in FIG. 1, direct the exhaust gases 14 forwardly thereby providing reverse thrust for maneuvering, landing, etc.

During normal flight operation, however, the convergent flaps 16, 18 move in unison to define asymmetric, rectangular nozzle throat 32 for directing the exhaust gases 14 axially rearwardly into the nozzle outlet flow passage 20. In the prior art pitch vectoring nozzles, selectable pitch thrust is achieved by moving the upper and lower flap assemblies or the equivalents thereof so as to redirect the exhaust gases 14 relative to the nozzle centerline 12. As will be appreciated by those skilled in the art, rotating flap assemblies 22, 24 about their respective hinges 46, 48 disposed at the leading edges thereof permits the nozzle to be configured so as to vector the exhaust gas 14 in the vertical plane and to thereby achieve vertical pitch thrust vectoring.

The present invention, in addition to being able to achieve an exhaust passage 20 defined by parallel, spaced apart sidewalls 26, 27 and movable, planar upper and lower flap surfaces, divides each upper and lower flap assembly 22, 24 into a pair of upstream and downstream triangular flaps 50, 52, 54, 56. The upper and lower flap assemblies 22, 24 are each provided respectively with a skewed hinge 58, 60. The upper assembly skewed hinge 58 is skewed positively, i.e., counter clockwise, with respect to the corresponding leading edge hinge 46 while the lower flap assembly skewed hinge 60 is skewed oppositely, i.e., clockwise, with respect to the corresponding leading edge hinge 48. The result is two asymmetric flap assemblies with respect to the axis centerline, each of which may be separately configured so as to distort the upper or lower gas flow boundary for achieving yaw thrust vectoring as described hereinbelow.

Figure 2:
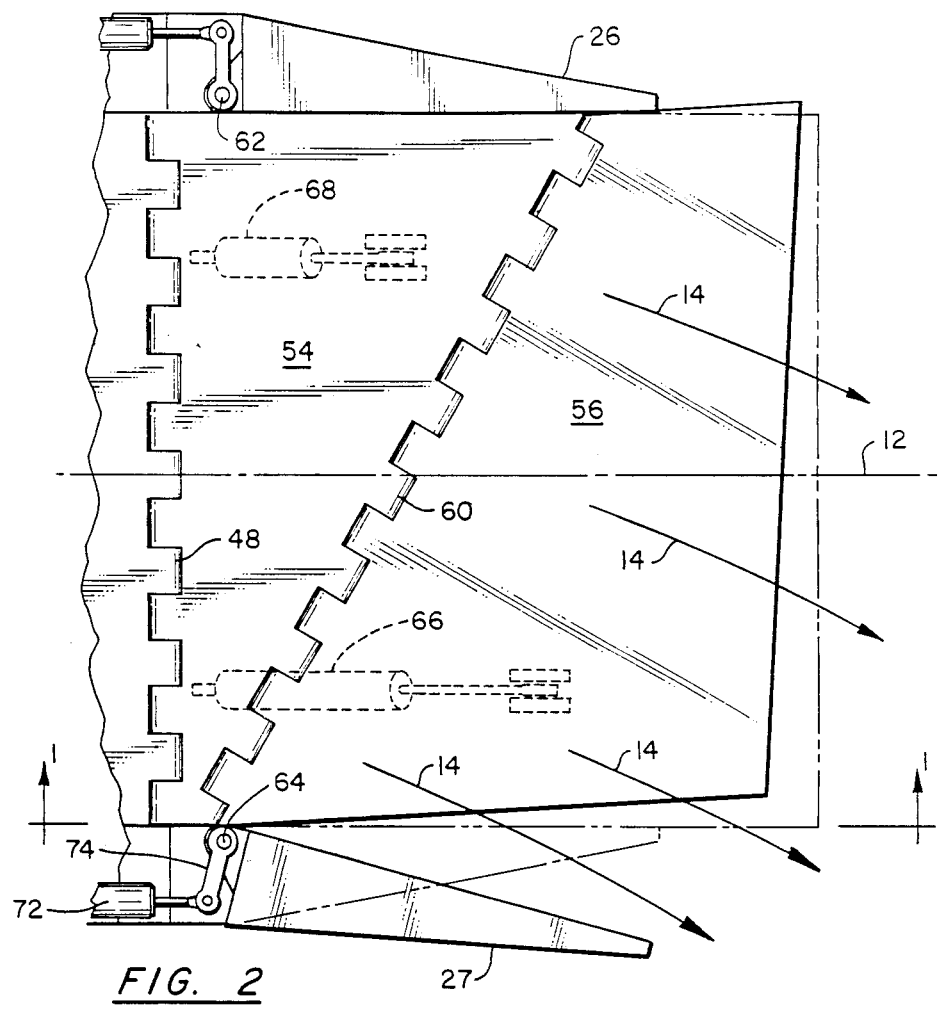
FIG. 2 shows a cross section of the exhaust nozzle configured as in FIG. 1 taken in the horizontal plane.

Further referring to FIG. 1 and FIG. 2 which shows a plan view of the lower flap assembly 24 configured so as to deliver left hand thrust vectoring, it may be seen that the downstream triangular flap 56 has been rotated outward about the lower flap skewed hinge 60 away from the nozzle central axis 12. The triangular flaps 54, 56 thus define a varying, asymmetric lower gas flow boundary whereby the flow of exhaust gas 14 entering the nozzle outlet passage 20 is redirected in the horizontal plane and produces a resultant yaw thrust vector.

Figure 3:
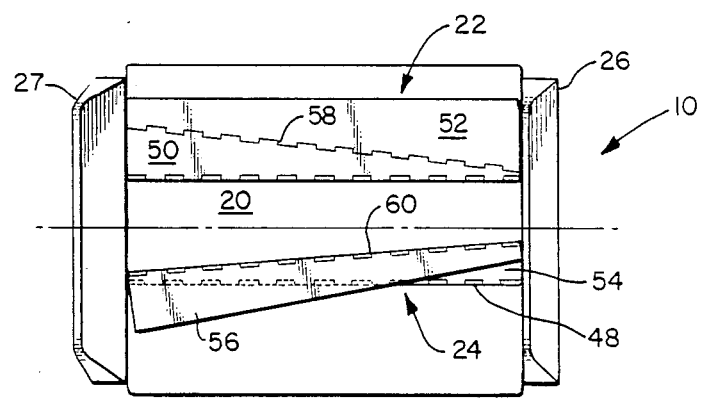
FIG. 3 shows a view of the nozzle according to the present invention looking forward into the exhaust gas flow passage.

FIG. 3 illustrates a view looking forward into the downstream end of the nozzle outlet passage 20 with the nozzle 10 configured as in FIGS. 1 and 2. The upstream triangular flap 54 of the lower flap assembly 24 is seen behind the downstream flap 56 which is pivoted outwardly about the skewed hinge 60. The asymmetric gas flow passage 20 is clearly illustrated as being narrower toward the right hand sidewall 26 and opening with lateral displacement toward the opposite sidewall 27. Yaw thrust vectoring performance is improved in the nozzle according to the present invention by providing hinges 62, 64 for allowing the sidwalls 26, 28 to be pivoted outward so as to relieve the vectored exhaust gas 14 as is illustrated in FIGS. 2 and 3 for the leftward thrust vectoring configuration.

It is a feature of the nozzle according to the present invention that the hinged sidewalls 26, 27 are pivoted outwardly only for the purpose of opening the nozzle gas boundaries to permit the vectored exhaust gases 14 to exit the nozzle and not, as in some prior art designs, for the purpose of themselves redirecting the exhaust gas flow. Sidewalls 26, 28 thus each remain parallel to the exhaust centerline 12 for pitch thrust vectoring configurations and for opposite direction yaw thrust vectoring configurations, opening outward only to permit the flow of exhaust gas redirected by the asymmetric reconfiguration of the upper or lower boundary as described above.

Although not specifically discussed above, it will be appreciated that right hand thrust vectoring for the nozzle according to the present invention is likewise achieved by rotating the triangular portions 50, 52 of the upper flap assembly 22 so as to define an asymmetric gas flow path which in turn induces the exhaust gases 14 to be vectored from the nozzle axis 12.

It will further be appreciated by those skilled in the art that the "triangular" flaps represented in the drawings by elements numbered 50, 52, 54, and 56 include flaps more specifically termed as being trapezoidal, such as flap 56 in FIG. 2, which is a unitary flap member having a triangular section and an adjacent rectangular section. The term triangular is thus used herein as a general term to define a flap member having the leading and trailing edges skewed with respect to each other.

FIGS. 1 and 2 also show a linkage arrangement for positioning the individual flaps 50, 52 and 54, 56 of the upper and lower flap assemblies 22, 24. The first linkage embodiment comprises a pair of flap actuators 66, 68 disposed between a fixed frame 70 of the nozzle 10 and the respective downstream and upstream flaps 56, 54. The individual linear actuators 66, 68 drive the flaps 56, 54 about the hinges 60, 48 to position and orient the individual flaps 56, 54 as desired. The action of the individual actuators 66, 68 must be scheduled relative to the position of the corresponding convergent flap 18 in order to properly define the desired exhaust gas flow passage 20. A similar pair of actuators (not numbered) position the upstream and downstream flaps 50, 52 of the upper flap assembly 22 as desired. FIG. 2 also suggests one means for outwardly pivoting the left hand sidewall 27, embodied as a linear actuator 72 operatively linked to a crank 74 for pivoting the sidewall 27 about the corresponding sidewall hinge 64.

Figure 4:
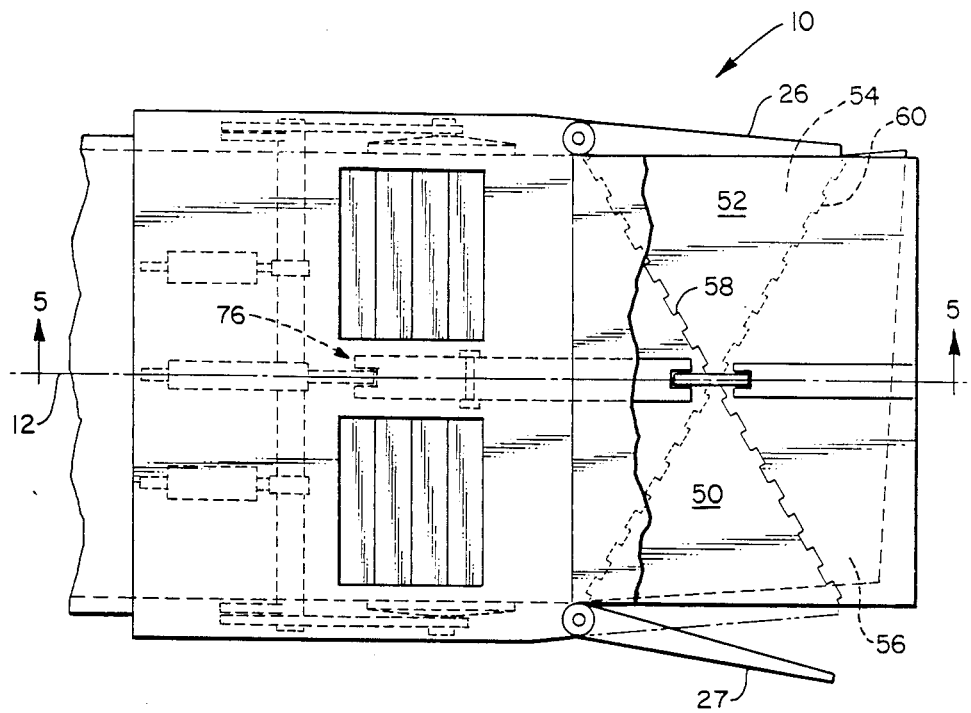
FIG. 4 shows a schematic view of an alternate embodiment of the nozzle according to the present invention.

FIG. 4 shows a view of a nozzle according to the present invention looking downward showing the upper and lower flap skew hinges 58, 60. This particular configuration includes a central tunnel flap actuator linkage denoted generally as 76 which is disposed along the centerline 12 and outboard of the corresponding convergent flap and flap assembly as shown in FIG. 5.

Figure 5:
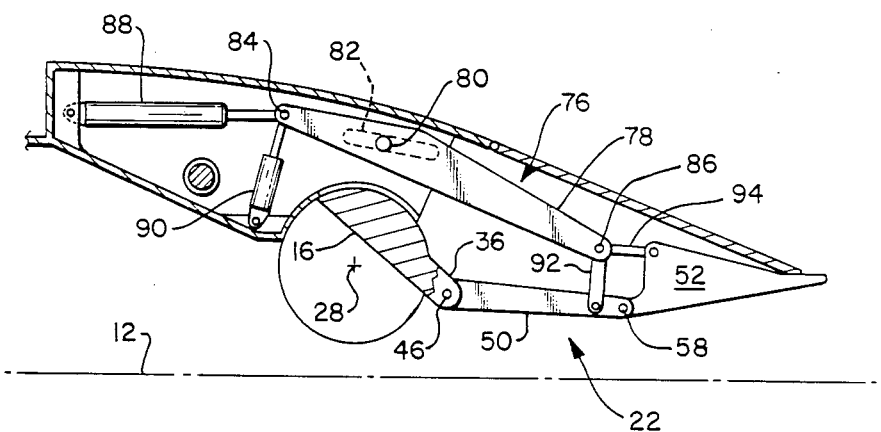
FIG. 5 shows a half plane cross section of the nozzle as shown in FIG. 4 illustrating an alternative linkage arrangement for actuating the downstream flap assemblies.

Referring to FIG. 5 which shows a half plane vertical section of the exhaust nozzle according to the present invention, the upper flap assembly 22 is seen pivotally secured to the trailing edge of the upper convergent flap 16. The flap assembly 22 includes the upstream and downstream triangular flaps 50, 52 as described hereinabove. The individual flaps 50, 52 are positioned by a translating beam 78 which includes a pivot roller 80 received within a cam race 82 disposed in the nozzle fixed structure. The translating beam 78 includes an actuator end 84 and a flap end 86, the actuator end 84 being positioned by the translating and pivoting actuators 88, 90 respectively. The flap end 86 is secured to the flap members 50, 52 by corresponding flap links 92, 94. The links 92, 94 and actuators 88, 90 are pivotally secured at the ends thereof, thus permitting free rotation between the linked members and the translating beam 78.

In operation, the linkage 76 according to the present invention provides independent actuation of the flaps 50, 52 via the movement of the translating beam 76 under the influence of the translating and pivoting actuators 88, 90. Specifically, the overall movement of the upper flap assembly 22 about the lateral hinge 46 is accomplished by movement of the translating actuator 88. The translating actuator causes the pivot roller 80 of the translating beam 78 to move within the cam race 82, thus driving the flap end 86 of the translating beam 78 substantially axially with respect to the remaining nozzle structure. Flap members 50, 52 are thus rotated about the lateral hinge 46 at the leading edge of the flap assembly 22 substantially in unison. Differential movement of the flap members 50, 52 about the diagonally skewed hinge 58 is achieved by movement of the pivoting actuator 90 which causes rotation of the translating beam 76 about the pivot roller 80. Such rotation of the translating beam 76 moves the flap end 86 relative to the skewed hinge 58, thus causing relative rotation between the individual flap members 50, 52 through the flap links 92, 94.

During operation of the nozzle as shown in FIGS. 4 and 5, pitch thrust vectoring is achieved by the action primarily of the translating actuator 88 which rotates the entire flap assembly 22 about the leading edge hinge 46, while yaw thrust vectoring is achieved primarily by the action of the pivoting actuator 90 which reconfigures the upper gas boundary defined by the upper flap assembly 22. The lower flap assembly (not shown in FIG. 5) is actuated by a similar opposing linkage (not shown).

The arrangement of the exhaust nozzle 10 according to the present invention is thus well suited to provide a multiplane (yaw and pitch) thrust vectoring exhaust nozzle which requires a minimum of added complexity over known prior art two dimensional convergent-divergent exhaust nozzles. The diagonally skewed hinges provided in each of the upper and lower flap assemblies allows the respective gas boundaries in the usually divergent nozzle outlet gas passage 20 to be configured so as to define an asymmetric flow channel to thereby induce vectored exhaust gas flow.

The articulated flap assemblies and hinged sidewalls are the only major modifications provided to the prior art designs, and the actuation linkage embodiments disclosed hereinabove are comparable in complexity to the actuation mechanisms for the prior art, pitch only nozzle configurations. The nozzle according to the present invention is thus well adapted to achieve the objects and advantages set forth hereinabove, both in the embodiment disclosed in the foregoing specification as well as in other, equivalent embodiments which may occur to those skilled in the art. The foregoing specification should thus be interpreted solely in an illustrative sense, with the scope of the invention limited herein only as specifically recited in the following claims.

I claim:

1. A nozzle outlet arrangement for selectably directing a stream of exhaust was with respect to a central axis, comprising:
   first and second parallel sidewalls spaced apart laterally on each side of the central axis;
   an upper flap assembly and a lower flap assembly, each flap assembly spaced apart vertically on each side of the central axis and extending between the sidewalls, the flap assemblies and sidewalls collectively defining an exhaust gas flow passage with an upstream opening and a downstream opening, wherein the upstream opening receives the stream of exhaust gas and the downstream opening discharges the exhaust gas from the nozzle;
   the upper flap assembly further comprising:
   a first leading edge hinge defining an upstream edge of the upper flap assembly, extending between the first and second sidewalls, and oriented perpendicular thereto,
   a first mid flap hinge, located downstream of the first leading edge hinge and extending between the first and second sidewalls, the first midflap hinge being skewed with respect to the first leading edge hinge for dividing the upper flap assembly into two complimentary triangular flaps;
   the lower flap assembly further comprising:
   a second leading edge hinge defining an upstream edge of the lower flap assembly, extending between the first and second sidewalls, and oriented perpendicular with respect thereto,
   a second midflap hinge located downstream of the second leading edge hinge and extending between the first and second sidewalls, the second midflap hinge being reversely skewed with respect to the second leading hinge for dividing the lower flap assembly into two complimentary triangular flaps; and
   means for selectably positioning each triangular flap about the corresponding first and second leading edge and midflap hinges thereof, whereby the shape of the exhaust gas flow passage is selectably variable for directing the stream of exhaust gas from the downstream opening at a desired vector angle with respect to the central axis for achieving yaw and pitch thrust vectoring.

2. The nozzle outlet arrangement as recited in claim 1, further comprising:
   first and second vertical sidewall hinges, each hinge disposed in the corresponding first and second sidewall and located axially coincident with the first and second flap assembly leading edge hinges, each hinge being operable to pivot the corresponding sidewall outwardly to facilitate the corresponding laterally vectored exhaust gas flow resulting from reconfiguration of the exhaust gas flow passage.

3. The nozzle as recited in claim 1, wherein the actuation means further includes:
   a translating beam, having an actuator end and a pivot end, said beam further including:
   a pivot roller disposed intermediate the beam ends and cooperatively engaged with a cam race disposed in a fixed nozzle frame, the pivot end of the translating beam being secured via corresponding first and second flap links to the two triangular flaps of the upper flap assembly, the actuator end of said beam being secured to a translating actuator and a pivoting actuator, the translating actuator being secured to the fixed nozzle frame and oriented so as to drive the translating beam longitudinally along the cam race, and the pivoting actuator being oriented at a substantial angle to the translating actuator for rotating the translating beam about the roller pivot.

4. In a pitch thrust vectoring, two dimensional, convergent-divergent exhaust nozzle for a gas turbine engine, wherein the nozzle includes two laterally spaced apart vertical sidewalls, two laterally spaced apart convergent flaps extending between the sidewalls and including means for pivoting each convergent flap in unison about a corresponding lateral pivot axis, the convergent flaps each having a downstream edge defining a variable area convergent throat therebetween, two vertically spaced apart, divergent flaps disposed downstream of the convergent flaps and extending between the sidewalls, each divergent flap having an upstream edge hinged to the downstream edge of one of the convergent flaps, the improvement comprising:

first and second oppositely skewed hinges, dividing the divergent flaps into two complimentary triangular portions, the first skewed hinge disposed in the one of the divergent flaps and skewed with respect to the hinged upstream edge thereof, the second skewed hinge disposed in the other of the divergent flaps and reversely skewed with respect to the hinged upstream edge thereof; and means for positioning the two triangular portions of each divergent flap so as to selectably define an asymmetric exhaust flow boundary, thereby achieving yaw thrust vectoring.

* * * * *

UNITED STATES PATENT AND TRADEMARK OFFICE
CERTIFICATE OF CORRECTION

PATENT NO. : 4,848,664

DATED : July 18, 1989

INVENTOR(S) : Edward B. Thayer

It is certified that error appears in the above-identified patent and that said Letters Patent is hereby corrected as shown below:

Column 6, Line 5, "was" should read --gas--.

Signed and Sealed this

Twenty-second Day of May, 1990

*Attest:*

*Attesting Officer*

HARRY F. MANBECK, JR.

*Commissioner of Patents and Trademarks*